(12) United States Patent
Hosford et al.

(10) Patent No.: US 11,977,852 B2
(45) Date of Patent: May 7, 2024

(54) ANAPHORIC REFERENCE RESOLUTION USING NATURAL LANGUAGE PROCESSING AND MACHINE LEARNING

(71) Applicant: Bank of America Corporation, Charlotte, NC (US)

(72) Inventors: Aaron Michael Hosford, Denison, TX (US); Donatus E. Asumu, McKinney, TX (US); Emad Noorizadeh, Plano, TX (US); Ramakrishna Reddy Yannam, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 255 days.

(21) Appl. No.: 17/647,789

(22) Filed: Jan. 12, 2022

(65) Prior Publication Data
US 2023/0222294 A1 Jul. 13, 2023

(51) Int. Cl.
*G06F 40/40* (2020.01)
*G06F 40/205* (2020.01)
*G06F 40/30* (2020.01)
*G10L 15/26* (2006.01)

(52) U.S. Cl.
CPC ............ *G06F 40/40* (2020.01); *G06F 40/205* (2020.01); *G06F 40/30* (2020.01); *G10L 15/26* (2013.01)

(58) Field of Classification Search
CPC ........ G06F 40/40; G06F 40/205; G06F 40/30; G06F 40/279; G06F 40/284; G10L 15/26
USPC ............................................................ 704/9
See application file for complete search history.

(56) References Cited

U.S. PATENT DOCUMENTS

| | | |
|---|---|---|
| 4,974,191 A | 11/1990 | Amirghodsi et al. |
| 5,933,822 A | 8/1999 | Braden-Harder et al. |
| 5,963,940 A | 10/1999 | Liddy et al. |
| 6,006,221 A | 12/1999 | Liddy et al. |
| 6,026,388 A | 2/2000 | Liddy et al. |
| 6,112,168 A | 8/2000 | Corston et al. |
| 6,336,029 B1 | 1/2002 | Ho et al. |
| 6,389,415 B1 | 5/2002 | Chase |
| 6,401,061 B1 | 6/2002 | Zieman |
| 6,418,435 B1 | 7/2002 | Chase |
| 6,453,315 B1 | 9/2002 | Weissman et al. |
| 6,498,921 B1 | 12/2002 | Ho et al. |
| 6,529,864 B1 | 3/2003 | Chase |

(Continued)

FOREIGN PATENT DOCUMENTS

| | | |
|---|---|---|
| WO | 0188662 A2 | 11/2001 |
| WO | 0207003 A2 | 1/2002 |
| WO | 0249253 A2 | 6/2002 |

*Primary Examiner* — Thuykhanh Le (57) ABSTRACT

A device configured to receive a sentence that includes a plurality of words. The device is further configured to input the words into a machine learning model that is configured to output a first feature vector based on the words. The device is further configured to identify a keyword within the sentence and to determine that the keyword is an implicit reference to an item. The device is further configured to identify a second feature vector in a reference list that closest matches a numeric value of the first feature vector and to identify an explicit reference in the reference list that is associated with the second feature vector. The device is further configured to replace the keyword with the explicit reference in the sentence and to output the sentence that includes the first explicit reference.

20 Claims, 3 Drawing Sheets

(56) References Cited

U.S. PATENT DOCUMENTS

| | | | |
|---|---|---|---|
| 7,475,010 B2 | 1/2009 | Chao | |
| 8,204,751 B1* | 6/2012 | Di Fabbrizio | G10L 15/22 704/277 |
| 8,620,662 B2 | 12/2013 | Bellegarda | |
| 8,631,007 B1* | 1/2014 | Blandford | G06Q 30/0241 707/736 |
| 8,954,329 B2 | 2/2015 | Labsky | G10L 13/08 704/260 |
| 9,052,748 B2 | 6/2015 | Medlock et al. | |
| 9,190,054 B1 | 11/2015 | Riley et al. | |
| 9,268,765 B1 | 2/2016 | Rose Charvet et al. | |
| 9,542,441 B1* | 1/2017 | Buchanan | G06F 16/24578 |
| 9,734,193 B2* | 8/2017 | Rhoten | G06F 16/243 |
| 9,754,591 B1* | 9/2017 | Kumar | G10L 15/22 |
| 9,767,501 B1* | 9/2017 | Schaaf | G06Q 30/0623 |
| 9,966,068 B2 | 5/2018 | Cash et al. | |
| 10,002,129 B1 | 6/2018 | D'Souza | |
| 10,019,994 B2 | 7/2018 | Keen | |
| 10,176,167 B2 | 1/2019 | Evermann | |
| 10,191,654 B2 | 1/2019 | Clements et al. | |
| 10,482,885 B1* | 11/2019 | Moniz | G06F 3/167 |
| 10,521,466 B2 | 12/2019 | Bellegarda et al. | |
| 10,540,976 B2* | 1/2020 | Van Os | G06F 3/167 |
| 10,613,746 B2 | 4/2020 | Medlock et al. | |
| 10,733,375 B2 | 8/2020 | Li et al. | |
| 10,795,902 B1* | 10/2020 | Setlur | G06F 3/04847 |
| 10,810,274 B2 | 10/2020 | Thomson et al. | |
| 11,010,396 B1* | 5/2021 | Setlur | G06F 3/04847 |
| 11,030,207 B1* | 6/2021 | Setlur | G06F 40/30 |
| 11,120,799 B1* | 9/2021 | Sundararaman | G06F 40/253 |
| 11,226,720 B1* | 1/2022 | Vandivere | G06N 7/01 |
| 11,783,815 B2* | 10/2023 | Greborio | G10L 15/30 704/9 |
| 11,798,538 B1* | 10/2023 | Parker | G10L 15/183 |
| 2001/0047346 A1 | 11/2001 | Liu et al. | |
| 2002/0059069 A1 | 5/2002 | Hsu et al. | |
| 2003/0130976 A1 | 7/2003 | Au | |
| 2004/0044516 A1 | 3/2004 | Kennewick et al. | |
| 2006/0136352 A1 | 6/2006 | Brun et al. | |
| 2006/0277045 A1 | 12/2006 | Gleason | |
| 2006/0287856 A1 | 12/2006 | He et al. | |
| 2007/0100790 A1 | 5/2007 | Cheyer et al. | |
| 2007/0118357 A1* | 5/2007 | Kasravi | G06F 40/30 704/10 |
| 2008/0129520 A1 | 6/2008 | Lee | |
| 2009/0089058 A1 | 4/2009 | Bellegarda | |
| 2009/0164441 A1 | 6/2009 | Cheyer | |
| 2009/0225041 A1* | 9/2009 | Kida | G06F 3/0237 345/173 |
| 2009/0254345 A1 | 10/2009 | Fleizach et al. | |
| 2010/0106484 A1 | 4/2010 | U et al. | |
| 2010/0185670 A1 | 7/2010 | Krishnan et al. | |
| 2010/0280828 A1* | 11/2010 | Fein | G10L 15/1822 704/E15.005 |
| 2011/0004475 A1 | 1/2011 | Bellegarda | |
| 2011/0301941 A1 | 12/2011 | De Vocht | |
| 2013/0138428 A1* | 5/2013 | Chandramouli | H04L 63/1416 704/9 |
| 2015/0032444 A1* | 1/2015 | Hamada | G06F 40/30 704/9 |
| 2015/0205782 A1 | 7/2015 | Subramanya et al. | |
| 2015/0261744 A1* | 9/2015 | Suenbuel | G06F 40/211 704/9 |
| 2016/0154790 A1* | 6/2016 | Daraselia | G06F 16/313 704/9 |
| 2016/0188565 A1* | 6/2016 | Robichaud | G06F 40/35 704/9 |
| 2017/0060531 A1* | 3/2017 | Abbo | G06F 3/0488 |
| 2017/0249384 A1* | 8/2017 | Kandylas | G06F 16/358 |
| 2018/0011830 A1* | 1/2018 | Iida | G06F 40/268 |
| 2018/0260680 A1* | 9/2018 | Finkelstein | G06N 5/04 |
| 2018/0293221 A1* | 10/2018 | Finkelstein | G06N 20/00 |
| 2018/0314689 A1* | 11/2018 | Wang | G10L 15/1822 |
| 2020/0143814 A1* | 5/2020 | Moniz | G10L 17/06 |
| 2020/0160042 A1* | 5/2020 | Bui | G06V 10/764 |
| 2020/0175019 A1* | 6/2020 | Pichaimurthy | G06F 16/7837 |
| 2020/0272693 A1* | 8/2020 | Mody | G06F 16/345 |
| 2020/0321085 A1* | 10/2020 | Kartoun | G16H 50/20 |
| 2020/0327189 A1* | 10/2020 | Li | G06F 40/56 |
| 2020/0380077 A1* | 12/2020 | Ge | G10L 15/18 |
| 2020/0380991 A1* | 12/2020 | Ge | G10L 15/22 |
| 2021/0174022 A1* | 6/2021 | Ishikawa | G06F 40/211 |
| 2021/0248171 A1* | 8/2021 | Miao | G06F 40/295 |
| 2021/0294972 A1* | 9/2021 | Zhang | G06F 40/253 |
| 2022/0012437 A1* | 1/2022 | Kim | G06F 40/58 |
| 2022/0086209 A1* | 3/2022 | Suto | H04L 65/80 |
| 2022/0188516 A1* | 6/2022 | Baughman | G06F 40/211 |
| 2022/0198136 A1* | 6/2022 | Peleg | G06F 40/30 |
| 2022/0262352 A1* | 8/2022 | Tian | G06F 40/166 |
| 2023/0004720 A1* | 1/2023 | Pelton | G06F 16/3344 |
| 2023/0073843 A1* | 3/2023 | Sampaio De Rezende | G06V 10/82 |
| 2023/0153546 A1* | 5/2023 | Peleg | G06F 40/166 704/9 |
| 2023/0376490 A1* | 11/2023 | Pichaimurthy | G06F 40/30 |

* cited by examiner

ANAPHORIC REFERENCE RESOLUTION USING NATURAL LANGUAGE PROCESSING AND MACHINE LEARNING

TECHNICAL FIELD

The present disclosure relates generally to natural language processing, and more specifically to anaphoric reference resolution using natural language processing and machine learning.

BACKGROUND

Existing computer systems lack the ability to analyze and process messages or requests from users that contain implicit references. An implicit reference is an anaphoric reference that refers to an item that was previously mentioned by a user. For examples of implicit references include words such as "it," "they", "those," "that," and "this." Analyzing messages with implicit references poses several technical challenges. For instance, at the outset of a message, a user may explicitly refer to an item (e.g. a computer) that they are having issues with. Later in the message, the user may begin to use implicit references such as "it." Since a message typically contains a combination of explicit references and implicit references, this means that a computer system needs to be able to accurately interpret what an implicit reference is referring to in order to understand a user's request. Without the ability to correctly interpret a user's message, the computer system is unable to accurately perform any requests that are made by the user. Trying to correctly interpret messages with implicit references is a technical challenge that can lead to inefficiencies that consume the limited amount of processing resourcing that a computer system has available. By consuming the available processing resources, these inefficiencies will reduce the computer system's ability to process data (e.g. other messages or requests) and reduce the throughput of the computer system.

SUMMARY

The disclosed system provides several practical applications and technical advantages that overcome the previously discussed technical problems. For example, the disclosed system provides a practical application by identifying explicit references to items that a user refers to in a message and replacing any implicit references in the message with their corresponding explicit references. This process provides a technical advantage by enabling the information system to modify received messages before forwarding the messages to a network device for processing. If the information system were to forward a message with implicit references to a network device, the network device will be unable to interpret the message to determine whether any actionable requests are being made by the user. By modifying the message before sending the message to the network device, the network device is able to more readily interpret the message for additional processing. This feature provides a technical improvement by increasing the capabilities of the network devices within the information system while allowing users to continue sending messages using natural language which may include a combination of explicit and implicit references. This process also results in a more consistent and efficient way of analyzing and processing messages and requests from users, which allows the information system to better manage its memory and processing resources. By improving the information system's ability to manage its resources, the information system is able to provide higher throughput. Thus, the disclosed process improves the operation of the information system overall.

In one embodiment, the information system comprises a natural language processing device that is configured to receive a sentence that comprises a plurality of words. The device is further configured to input the words into a machine learning model that is configured to output a first feature vector based on the words. The device is further configured to identify a keyword within the sentence and to determine that the keyword is an implicit reference to an item. The device is further configured to identify a second feature vector in a reference list that closest matches a numeric value of the first feature vector and to identify an explicit reference in the reference list that is associated with the second feature vector. The device is further configured to replace the keyword with the explicit reference in the sentence and to output the sentence that comprises the first explicit reference.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Information System Overview

Figure 1:
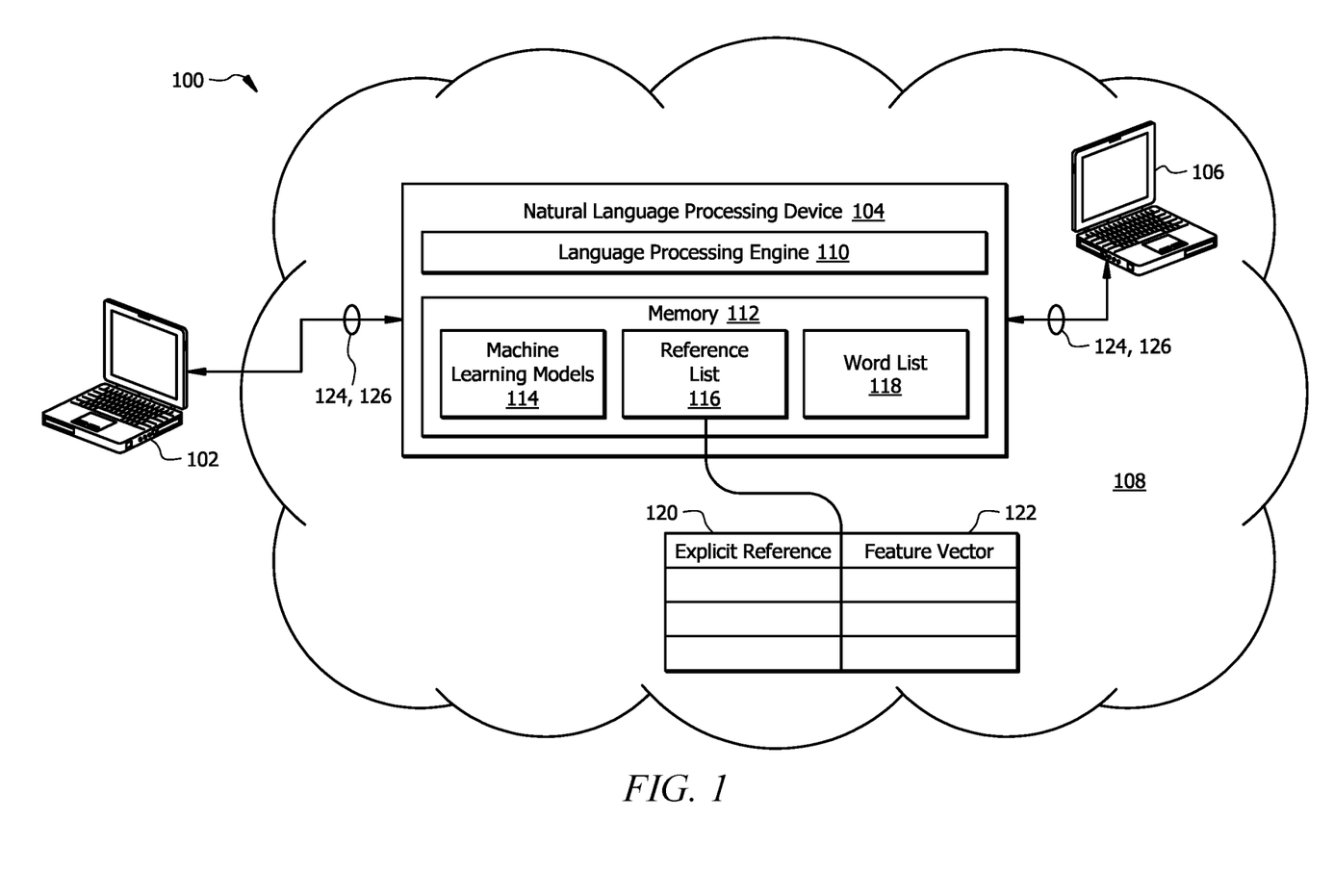
FIG. 1 is a schematic diagram for an information system configured with a natural language processing device.

FIG. 1 is a schematic diagram of an embodiment of an information system 100 that is generally configured to analyze and process messages 124 from a user. In the first phase, the natural language processing device 104 generates a reference list 116 of explicit references 120 to items that are associated with a user within a message 124 from the user. In the second phase, after generating the reference list 116 of explicit references 120, the natural language processing device 104 then uses a machine learning model 114 and the reference list 116 to identify an explicit reference 120 that corresponds with an implicit reference that is mentioned by the user. For example, within a message 124, a user may explicitly refer to their computer as having an issue. Later in the message 124, the user may begin using implicit references such as "it" to refer to their computer. In this example, the natural language processing device 104 first determines that the implicit reference is referring to their computer and then modifies the message 124 to use the explicit reference 120 instead of the implicit reference. If the natural language processing device 104 were to send the message 124 with the implicit reference, a network device 106 may be unable to interpret the message 124 to determine whether any actionable requests are being made by the user. By modifying the message 124 before sending the message 124 to the network device 106, the network device 106 is able to more readily interpret the message 124 for additional processing.

In one embodiment, the information system 100 comprises one or more user devices 102, a natural language processing device 104, and one or more network device 106 that are in signal communication with each other within a network 108. Network 108 allows communication between and amongst the various components of the information system 100. This disclosure contemplates network 108 being any suitable network operable to facilitate communication between the components of the information system 100. Network 108 may include any interconnecting system capable of transmitting audio, video, signals, data, messages, or any combination of the preceding. Network 108 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

User Devices

A user device 102 is a hardware device that is generally configured to provide hardware and software resources to a user. Examples of the user device 102 include, but are not limited to, a smartphone, a tablet, a laptop, a computer, a smart device, or any other suitable type of device. The user device 102 is configured to allow the user to send messages 124 to a network device 106. For example, the user may generate a message 124 by talking into their user device 102. In this example, the user device 102 may capture and transmit the message 124 as an audio signal (e.g. an audio recording) of the user speaking. As another example, the user may use their user device 102 to send a text message 124 to a network device 106. In this example, the user device 102 may transmit the text message 124 that is generated by the user. The user device 102 may send a text message 124 using a Short Message Service (SMS) message service, an email service, a chat window session, an Application Programming Interface (API), or any other suitable type of messaging service.

Network Devices

A network device 106 is a hardware device that is generally configured to provide hardware and software resources to a user. Examples of a network device 106 include, but are not limited to, a server, a database, a computer, a laptop, a smartphone, a tablet, a smart device, or any other suitable type of device. In some embodiments, the network device 106 is associated with technical support, customer support, or any other suitable type of service. Each network device 106 is configured to receive messages 124 or sentences 126 from a user via the natural language processing device 104 and to identify one or more actions to perform based on the messages 124 from the user. For example, a network device 106 may receive a message 124 from a user requesting information. In this example, the network device 106 is configured to identify the type of information the user is requesting, to obtain the requested information, and to send the requested information to the user. As another example, the network device 106 may receive a message 124 from a user that identifies an action for the network device 106 to perform such a modifying a user account settings. In other examples, the network device 106 may receive a message 124 from a user that requests any other suitable type of action to be performed by the network device 106.

In one embodiment, the network device 106 is configured to employ natural language processing to identify any requested actions from the messages 124 from a user. For example, the network device 106 may be configured to parse messages 124 from a user to identify keywords within the messages 124 from the user, to identify one or more actions associated with the identified keywords, and to execute the one or more actions. In other examples, the network device 106 may be configured to employ any other suitable technique or combination of techniques to identify actions based on messages 124 from a user.

Natural Language Processing Device

Examples of a natural language processing device 104 include, but are not limited to, a server, a computer, or any other suitable type of network device. In one embodiment, a natural language processing device 104 comprises a language processing engine 110 and a memory 112. Additional details about the hardware configuration of the natural language processing device 104 are described in FIG. 3. The memory 112 is configured to store one or more machine learning models 114, reference lists 116, word lists 118, and/or any other suitable type of data. In FIG. 1, the natural language processing device 104 is shown as a standalone device. In some embodiments, the functionality of the natural language processing device 104 may be integrated within a user device 102 or a network device 106.

In one embodiment, the language processing engine 110 is generally configured to analyze messages 124 from a user to identify anaphoric references (i.e. implicit references) to items that a user previously mentioned, to identify a corresponding explicit reference for the item that is associated with the user, and to replace the implicit reference with the identified explicit reference before sending the message 124 to the network device 106 for further processing. An example of the language processing engine 110 performing this operation is described in more detail in FIG. 2.

Examples of machine learning models 114 include, but are not limited to, a multi-layer perceptron, a recurrent neural network (RNN), an RNN long short-term memory (LSTM), a convolutional neural network (CNN), or any other suitable type of neural network model. Additional details about the machine learning model 114 are described in FIG. 2. In one embodiment, a machine learning model 114 is generally configured to receive a plurality of words or a sentence that contains either an explicit reference or an implicit reference to an item associated with a user as an input. An explicit reference is a word that identifies an item associated with a user. Examples of explicit references include, but are not limited to, a name, an object name, account number, a descriptor, a phone number, an email address, or any other suitable type of identifier. For example, an explicit reference may include words such as "my account," "my card," "my username," "my password," "my phone," and "my computer." An implicit reference is an anaphoric reference that refers to an item that was previously mentioned. Examples of implicit references include, but are not limited to, words such as "it," "they", "those," "that," and "this." As an example, a first sentence may state "My password is not working" and a second sentence may state "Why isn't it working?" In this example, the "my password" is the explicit reference" and "it" is the implicit reference that refers to the same item (i.e. "my password").

The machine learning model 114 is further configured to output a feature vector 122 based on the provided input. A feature vector 122 is a numeric value that represents a relationship between an explicit reference 120 and one or more words in a sentence that contains the explicit reference 120. The feature vector 122 may be represented a binary value, a decimal value, or any other suitable data type.

The machine learning model 114 is trained using supervised learning training data that comprises a first sentence with an explicit reference 120 to an item associated with a user and a corresponding second sentence with an implicit reference to the item that is associated with the user. In the training data, the explicit reference and the implicit reference may both be identified and labeled for the machine learning model 114. During the training process, the machine learning model 114 determines weights and bias values that allow the machine learning model 114 to map sentences to different feature vectors 122. Through this process, the machine learning model 114 is able to determine a feature vector 122 based on the words within a sentence. Additional details about the machine learning model training are described below in FIG. 2. The language processing engine 110 may be configured to train the machine learning models 114 using any suitable technique as would be appreciated by one of ordinary skill in the art. In some embodiments, the machine learning model 114 may be stored and/or trained by a device that is external from the natural language processing device 104.

The reference list 116 generally comprises a list of previously identified explicit references 120. Each explicit reference 120 is linked with a feature vector 122 that was previously determined by the machine learning model 114 based on other words that were in a sentence with the explicit reference 120. The natural language processing device 104 is configured to add entries to the reference list 116 each time a new explicit reference 120 is identified in a message 124 from a user. The natural language processing device 104 is further configured to use the reference list 116 to identify explicit references 120 that correspond with an implicit reference using feature vectors 122. An example of the natural language processing device 104 performing these operations is described in FIG. 2.

The word list 118 generally comprises a list of words or phrases that are used to identify explicit references 120 and/or implicit references. For example, the word list 118 may comprise words for implicit references such as "it," "they", "those," "that," and "this." The natural language processing device 104 is configured to identify an implicit reference by comparing words in a message 124 from a user to the words in the word list 118 to determine whether any of the words from the message 124 match a word from the word list 118. In some embodiments, the word list 118 may further comprise any other suitable type of words or phrases that can be used to identify other types of words that are used in a message 124 from a user.

Message Analyzing Process

Figure 2:
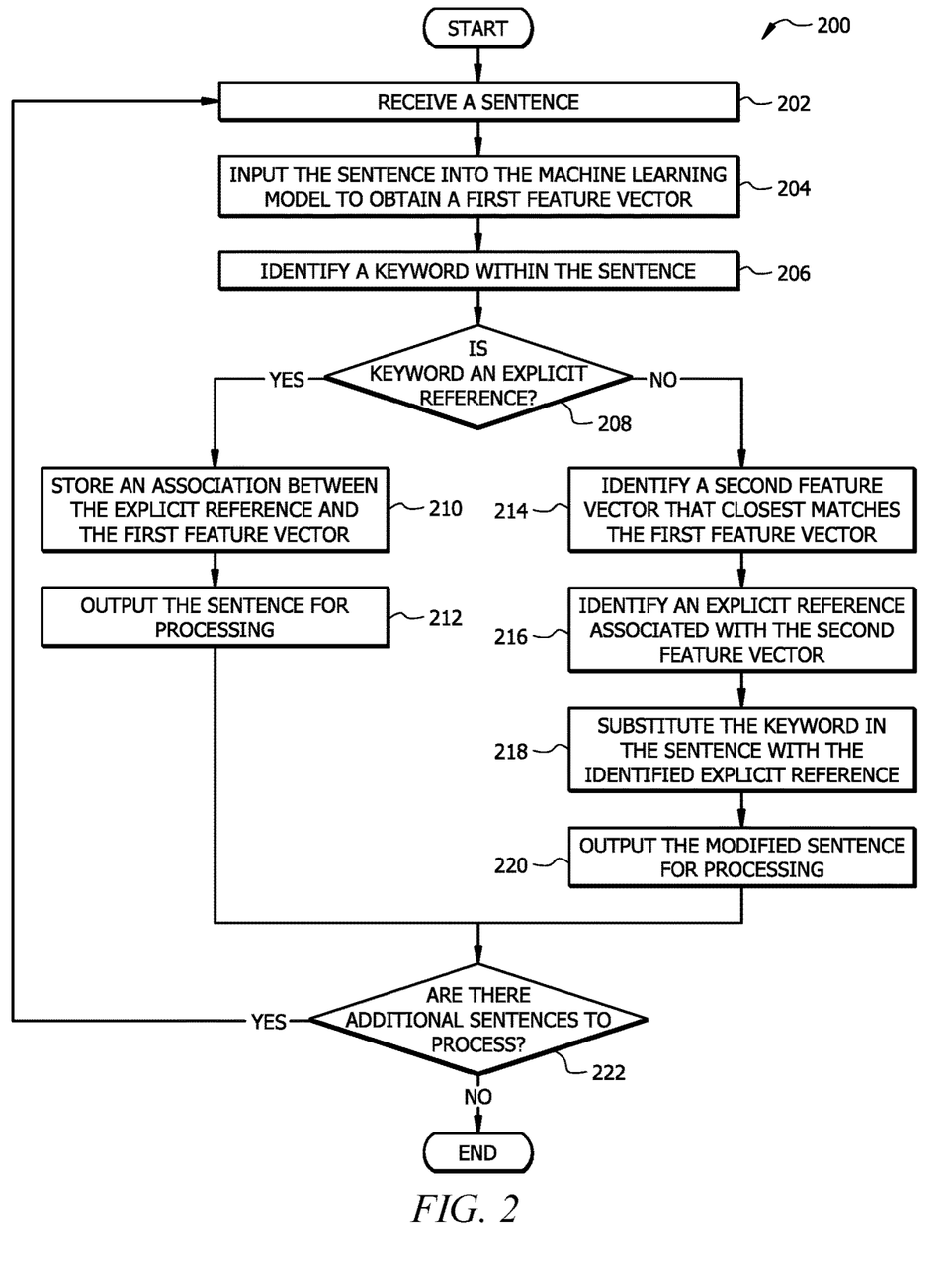
FIG. 2 is a flowchart of an embodiment of a message analyzing process for the information system.

FIG. 2 is a flowchart of an embodiment of a message analyzing process 200 for the information system 100. The information system 100 may employ process 200 to record explicit references 120 that are made by a user in message 124. The information system 100 may also use process 200 to identify an explicit reference 120 that corresponds with an implicit reference that is mentioned by the user and to modify the message 124 to replace the implicit reference with the explicit reference 120. By modifying the message 124 before sending the message 124 to a network device 106, the network device 106 is able to more readily interpret the message 124 for additional processing.

Machine Learning Model Training

During the machine learning model training phase, the natural language processing device 104 trains the machine learning model 114 to generate a feature vector 122 that represents a relationship between an explicit reference, an implicit reference, and one or more words in a sentence that contains each reference. In one embodiment, the natural language processing device 104 trains the machine learning model 114 using pairs of sentences. In this example, the first sentence contains an explicit reference 120 to an item that is associated with a user and the second sentence contains an implicit reference to the same item. During the training process, the machine learning model 114 determines a first feature vector 122 for the first sentence and a second feature vector 122 for the second sentence. The first feature vector 122 and the second feature vector 122 are each mapped to values that indicate a relationship between the explicit reference 120 and the implicit reference. For example, the first feature vector 122 and the second feature vector 122 may have similar values which indicate that the feature vectors 122 are referring to the same item. In this case, when feature vectors 122 have dissimilar values, this indicates that the feature vectors 122 are referring to different items. In other words, when feature vectors 122 have dissimilar values, the explicit reference 120 and the implicit reference are not referring to the same item. In general, the similarity between two feature vectors 122 correlates with the probability that an explicit reference 120 and an implicit reference are referring to the same item.

The natural language processing device 104 trains the machine learning model 114 by parsing each sentence into a plurality of words and then inputs each of the words into the machine learning model 114 as training data. In one embodiment, the training data is organized to identify words that are come before a reference (e.g. an explicit reference 120 or an implicit reference) in a sentence, the reference keyword (i.e. an explicit reference 120 or an implicit reference), and words that come after the reference in the sentence. In some embodiments, the training data may also identify the total number of words that are in the sentence. In other embodiments, the natural language processing device 104 may use any other suitable type of formatting or organization for the training data.

Using the Machine Learning Model

After training the machine learning model 114, the natural language processing device 104 uses the machine learning model 114 to identify explicit references 120 for any implicit references that are present in a message 124 from a user. At operation 202, the natural language processing device 104 receives a sentence. In one embodiment, the natural language processing device 104 receives a message 124 from a user. The message 124 may be a text-based or an audio signal that contains the user speaking. When the message 124 is an audio signal, the natural language processing device 104 first converts the audio signal into a text message. The natural language processing device 104 may use any suitable natural language processing technique to identify words spoken by the user in the audio signal and to convert the identified words into a text transcript or message. After obtaining a text-based version of the message 124 from the user, the natural language processing device 104 parses the message 124 into sentences. For example, the natural language processing device 104 may analyze the text within a message 124 to identify any punctuation that is used. After identifying punctuation marks, the natural language processing device 104 may then segment the message 124 using the identified punctuation marks as delimiters. For example, the text that precedes a punctuation mark may be grouped as a sentence. In other examples, the natural language processing device 104 may use any other suitable type of process for identifying sentences within the message 124. After identifying the sentences within the message 124, the natural language processing device 104 then begins iteratively selecting sentences to analyze and process.

At operation 204, the natural language processing device 104 inputs the sentence into the machine learning model 114 to obtain a first feature vector 122. The natural language processing device 104 first parses the sentence into a plurality of words and then inputs the words into the machine learning model 114 using the same format or organization that was previously described for training the machine learning model 114. For example, the natural language processing device 104 may first parse the sentence into a plurality of words and then organize words to identify words that are come before a reference (e.g. an explicit reference 120 or an implicit reference) in a sentence, the reference keyword, and words that come after the reference in the sentence. In some examples, the natural language processing device 104 may also count the total number of words in the sentence and provide the total number of words as an input for the machine learning model 114.

At operation 206, the natural language processing device 104 identifies a keyword within the sentence. The keyword is a word in the sentence that refers to an item that is associated with a user. The keyword may be an explicit reference 120 or an implicit reference. In one embodiment, the natural language processing device 104 uses the word list 118 to identify the keyword. For example, the natural language processing device 104 may compare each word in the sentence to the words in the word list 118. The word list 118 comprises words that correspond with different types of explicit references 120 and implicit references. In this example, the natural language processing device 104 identifies a word in the sentence that matches a word from the word list 118 as the keyword. In other embodiments, the natural language processing device 104 may use any other suitable technique for identifying a keyword within the sentence.

At operation 208, the natural language processing device 104 determines whether the keyword is an explicit reference 120. Continuing with the previous example, the natural language processing device 104 may also use the word list 118 to determine whether the identified keyword is an explicit reference 120 or an implicit reference. In this example, each word in the word list 118 is identified as being either an explicit reference 120 or an implicit reference. After identifying the keyword in the sentence, the natural language processing device 104 then uses the word list 118 to determine whether the identified keyword is identified as an explicit reference 120 or an implicit reference in the word list 118.

The natural language processing device 104 proceeds to operation 210 in response to determining that the keyword is an explicit reference 120. In this case, the natural language processing device 104 proceeds to operation 210 to store an association between the explicit reference 120 and the feature vector 122 that is obtained from the machine learning model 114. At operation 210, the natural language processing device 104 stores an association between the explicit reference 120 and the first feature vector 122 in the reference list 116. Here, the natural language processing device 104 creates an entry in the reference list 116 that links the identified explicit reference 120 from the sentence with the feature vector 122 that was obtained from inputting the sentence into the machine learning model 114. After generating the new entry in the reference list 116, the natural language processing device 104 may use the reference list 116 to identify explicit references 120 that correspond with an implicit reference in a subsequent sentence from the user. An example of this process is described in operation 214.

At operation 212, the natural language processing device 104 outputs the sentence 126 for processing. After determining that the sentence 126 contains an explicit reference 120, the natural language processing device 104 will then output the sentence 126 to the network device 106 for additional processing. In this case, the natural language processing device 104 does not need to modify the sentence 126 since the sentence 126 contains an explicit reference 120 that can be readily interpreted by the network device 106. After receiving the sentence 126 with the explicit reference 120, the network device 106 processes the sentence 126 to determine whether there are any actionable requests from the user to perform in the sentence 126. When the sentence 126 contains an actionable request, the network device 106 may perform one or more actions based on the request. For example, when the sentence 126 contains a request for account information, the network device 106 may identify an account that is associated with a user and send the requested account information to the user. The network device 106 may send any requested information to the user device 102 directly or via the natural language processing device 104. In other examples, the network device 106 may perform any other suitable type of operation based on the user's request.

Returning to operation 208, the natural language processing device 104 proceeds to operation 214 in response to determining that the keyword is not an explicit reference 120. In this case, the natural language processing device 104 determines that the keyword is an implicit reference. The natural language processing device 104 proceeds to operation 214 to begin the process for identifying a previously identified explicit reference 120 that corresponds with the implicit reference. At operation 214, the natural language processing device 104 identifies a second feature vector 122 in the reference list 116 that closest matches the first feature vector 122. Here, the natural language processing device 104 identifies a feature vector 122 from the reference list 116 that is most similar in value to the feature vector 122 that is obtained from the machine learning model 114. Since the machine learning model 114 is trained to output feature vectors 122 with similar values when an explicit reference 120 and an implicit reference are referring to the same item, this means that the natural language processing device 104 can leverage this property to identify an explicit reference 120 that has a feature vector 122 value that is most similar to the feature vector 122 for the implicit reference. For example, the natural language processing device 104 may determine a difference between the value of the feature vector 122 from the machine learning model 114 and the value of each of the feature vectors 122 in the reference list 116. In this example, the natural language processing device 104 identifies the feature vector 122 from the reference list 116 that is associated with the smallest difference. By identifying the feature vector 122 with the smallest difference, the natural language processing device 104 can identify the explicit reference 120 that most likely corresponds with the implicit reference.

At operation 216, the natural language processing device 104 identifies an explicit reference 120 that is associated with the second feature vector 122. After identifying the feature vector 122 in the reference list 116 with the smallest difference from the feature vector 122 of the implicit reference, the natural language processing device 104 then identifies the explicit reference 120 that is linked with the identified feature vector 122 in the reference list 116.

At operation 218, the natural language processing device 104 substitutes the keyword in the sentence 126 with the identified explicit reference 120. Since the identified explicit reference 120 and the implicit reference refer to the same item, the explicit reference 120 can be used in place of the implicit reference. The natural language processing device 104 uses this property to substitute or replace the implicit reference in the sentence 126 with the identified explicit reference 120 to generate a modified sentence 126. The natural language processing device 104 may delete the implicit reference from the sentence and then add the explicit reference 120 in place of the removed implicit reference in the sentence. As an example, a sentence 126 may originally state, "Please fix it." In this example, the natural language processing device 104 may replace the implicit reference "it" with an explicit reference, for example, "my computer." In this case, the natural language processing device 104 replaces the implicit reference in the sentence 126 with the explicit reference to generate a modified sentence that states, "Please fix my computer."

At operation 220, the natural language processing device 104 outputs the modified sentence 126 for processing. Here, the natural language processing device 104 outputs the modified sentence 126 to the network device 106 using a process similar to the process described in operation 212. If the natural language processing device 104 were to send the sentence 126 with the implicit reference, the network device 106 may be unable to interpret the sentence 126 to determine whether any actionable requests are being made by the user. By modifying the sentence 126 before sending the sentence 126 to the network device 106, the network device 106 is able to more readily interpret the sentence 126 for additional processing.

At operation 222, the natural language processing device 104 determines whether there are any additional sentences 126 to process. In one embodiment, the natural language processing device 104 keeps track of the number of sentences 126 that were identified in the message from the user in operation 202. The natural language processing device 104 also counts the number of sentences 126 that have been analyzed and processed. In this case, the natural language processing device 104 will determine that there are additional sentences 126 to process when the number of sentences 126 that have been processed by the natural language processing device 104 does not match the number of sentences 126 that were identified in the message 124 from the user. In this case, the natural language processing device 104 determines that one or more sentences 126 from the user's message 124 have not been processed yet. The natural language processing device 104 returns to operation 202 in response to determining that there are additional sentences 126 to process. In this case, the natural language processing device 104 returns to operation 202 to select another sentence 126 to analyze and process. Otherwise, the natural language processing device 104 terminates process 200 in response to determining that there are no more sentences 126 to process.

Hardware Configuration for the Natural Language Processing Device

Figure 3:
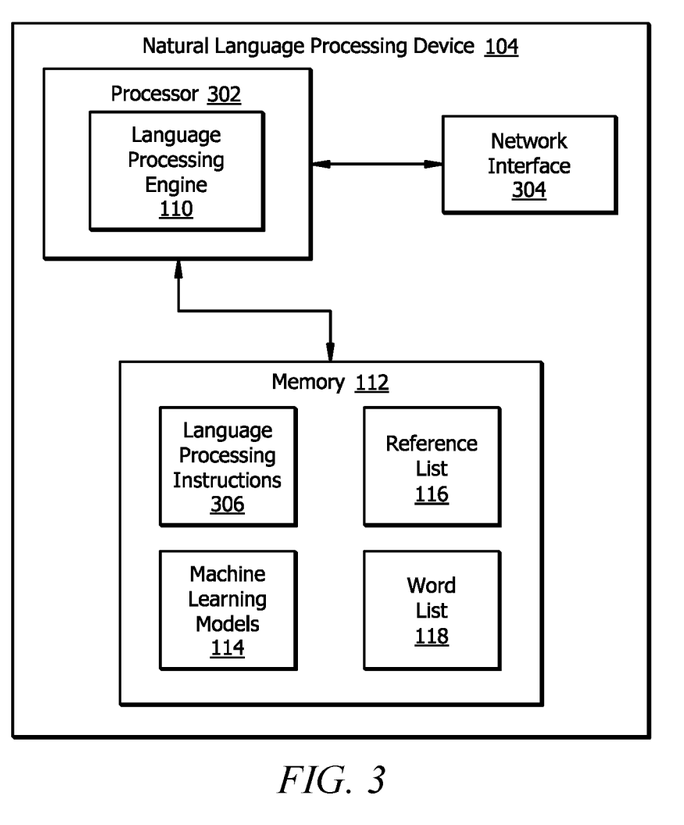
FIG. 3 is an embodiment of a natural language processing device for the information system.

FIG. 3 is an embodiment of a natural language processing device 104 for the information system 100. As an example, the natural language processing device 104 may be a server or a computer. The natural language processing device 104 comprises a processor 302, a memory 112, and a network interface 304. The natural language processing device 104 may be configured as shown or in any other suitable configuration.

Processor

The processor 302 is a hardware device that comprises one or more processors operably coupled to the memory 112. The processor 302 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 112 and the network interface 304. The one or more processors are configured to process data and may be implemented in hardware or software. For example, the processor 302 may be 8-bit, 16-bit, 32-bit, 64-bit, or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute language processing instructions 306 to implement the language processing engine 110. In this way, processor 302 may be a special-purpose computer designed to implement the functions disclosed herein. In an embodiment, the language processing engine 110 is implemented using logic units, FPGAs, ASICs, DSPs, or any other suitable hardware. The language processing engine 110 is configured to operate as described in FIGS. 1 and 2. For example, the language processing engine 110 may be configured to perform the operations of process 200 as described in FIG. 2.

Memory

The memory 112 is a hardware device that is operable to store any of the information described above with respect to FIGS. 1 and 2 along with any other data, instructions, logic, rules, or code operable to implement the function(s) described herein when executed by the processor 302. The memory 112 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise a read-only memory (ROM), random-access memory (RAM), ternary content-addressable memory (TCAM), dynamic random-access memory (DRAM), and static random-access memory (SRAM).

The memory 112 is operable to store language processing instructions 306, machine learning models 114, reference lists 116, word lists 118, and/or any other data or instructions. The language processing instructions 306 may comprise any suitable set of instructions, logic, rules, or code operable to execute the language processing engine 110. The machine learning models 114, the reference lists 116, and the word lists 118 are configured similar to the machine learning models 114, reference lists 116, and word lists 118 described in FIGS. 1 and 2, respectively.

Network Interface

The network interface 304 is a hardware device that is configured to enable wired and/or wireless communications. The network interface 304 is configured to communicate data between user devices 102, network devices 106, and other devices, systems, or domains. For example, the network interface 304 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 302 is configured to send and receive data using the network interface 304. The network interface 304 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A natural language processing device, comprising:
a memory operable to store a reference list, wherein:
the reference list identifies a plurality of explicit references that each identifies an item that is associated with a user; and
each explicit reference is associated with a feature vector, wherein the feature vector is a numeric value that represents a relationship between an explicit reference and one or more words in a sentence that contains the explicit reference; and
a processor operably coupled to the memory, configured to:
receive a sentence comprising a plurality of words;
input the plurality of words into a machine learning model, wherein the machine learning model is configured to:
receive the plurality of words; and
output a first feature vector based on the plurality of words;
identify a keyword within the sentence, wherein the keyword refers to a first item that is associated with the user;
determine the keyword is an implicit reference to the first item;
identify a second feature vector in the reference list that closest matches a numeric value of the first feature vector;
identify a first explicit reference in the reference list that is associated with the second feature vector;
replace the keyword with the first explicit reference in the sentence; and
output the sentence comprising the first explicit reference.

2. The device of claim 1, wherein the processor is further configured to:
receive a second sentence comprising a second plurality of words;
input the second plurality of words into the machine learning model to obtain a third feature vector based on the second plurality of words;
identify a second keyword within the second sentence, wherein the second keyword refers to a second item that is associated with the user;
determine the second keyword is an explicit reference to the second item; and
store an association between the second keyword and the third feature vector in the reference list.

3. The device of claim 1, wherein determining the keyword is an implicit reference comprises:
comparing the keyword to a list of words, wherein each word corresponds with an implicit reference; and
determining the keyword is an implicit reference in response to determining that the keyword matches a word in the list of words.

4. The device of claim 1, wherein identifying the keyword in the sentence comprises:
parsing the sentence into the plurality of words;
comparing each word from the plurality of words to a list of words; and
determining a first word from the plurality of words matches a second word from the list of words.

5. The device of claim 1, wherein:
the processor is further configured to:
count a number of words in the sentence; and
input the number of words in the sentence into the machine learning model when inputting the sentence into the machine learning model; and
the machine learning model determines the first feature vector based at least in part on the number of words in the sentence.

6. The device of claim 1, wherein receiving the sentence comprises:
receiving an audio signal of the user speaking; and
converting the audio signal into text.

7. The device of claim 1, wherein outputting the sentence with the first explicit reference comprises sending the sentence to a network device configured to perform an action based on the sentence.

8. A message analyzing method, comprising:
receiving a sentence comprising a plurality of words;
inputting the plurality of words into a machine learning model, wherein the machine learning model is configured to:
receive the plurality of words; and
output a first feature vector based on the plurality of words;

identifying a keyword within the sentence, wherein the keyword refers to a first item that is associated with the user;

determining the keyword is an implicit reference to the first item;

identifying a second feature vector in a reference list that closest matches a numeric value of the first feature vector, wherein:

the reference list identifies a plurality of explicit references that each identifies an item that is associated with a user; and each explicit reference is associated with a feature vector, wherein the feature vector is a numeric value that represents a relationship between an explicit reference and one or more words in a sentence that contains the explicit reference;

identifying a first explicit reference in the reference list that is associated with the second feature vector;

replacing the keyword with the first explicit reference in the sentence; and outputting the sentence comprising the first explicit reference.

9. The method of claim 8, further comprising:

receiving a second sentence comprising a second plurality of words;

inputting the second plurality of words into the machine learning model to obtain a third feature vector based on the second plurality of words;

identifying a second keyword within the second sentence, wherein the second keyword refers to a second item that is associated with the user;

determining the second keyword is an explicit reference to the second item; and storing an association between the second keyword and the third feature vector in the reference list.

10. The method of claim 8, wherein determining the keyword is an implicit reference comprises:

comparing the keyword to a list of words, wherein each word corresponds with an implicit reference; and determining the keyword is an implicit reference in response to determining that the keyword matches a word in the list of words.

11. The method of claim 8, wherein identifying the keyword in the sentence comprises:

parsing the sentence into the plurality of words;

comparing each word from the plurality of words to a list of words; and determining a first word from the plurality of words matches a second word from the list of words.

12. The method of claim 8, further comprising:

counting a number of words in the sentence; and inputting the number of words in the sentence into the machine learning model when inputting the sentence into the machine learning model; and wherein the machine learning model determines the first feature vector based at least in part on the number of words in the sentence.

13. The method of claim 8, wherein receiving the sentence comprises:

receiving an audio signal of the user speaking; and converting the audio signal into text.

14. The method of claim 8, wherein outputting the sentence with the first explicit reference comprises sending the sentence to a network device configured to perform an action based on the sentence.

15. A computer program product comprising executable instructions stored in a non-transitory computer-readable medium that when executed by a processor causes the processor to:

receive a sentence comprising a plurality of words;

input the plurality of words into a machine learning model, wherein the machine learning model is configured to:

receive the plurality of words; and output a first feature vector based on the plurality of words;

identify a keyword within the sentence, wherein the keyword refers to a first item that is associated with the user;

determine the keyword is an implicit reference to the first item;

identify a second feature vector in a reference list that closest matches a numeric value of the first feature vector, wherein:

the reference list identifies a plurality of explicit references that each identifies an item that is associated with a user; and each explicit reference is associated with a feature vector, wherein the feature vector is a numeric value that represents a relationship between an explicit reference and one or more words in a sentence that contains the explicit reference;

identify a first explicit reference in the reference list that is associated with the second feature vector;

replace the keyword with the first explicit reference in the sentence; and output the sentence comprising the first explicit reference.

16. The computer program product of claim 15, further comprising instructions that when executed by the processor causes the processor to:

receive a second sentence comprising a second plurality of words;

input the second plurality of words into the machine learning model to obtain a third feature vector based on the second plurality of words;

identify a second keyword within the second sentence, wherein the second keyword refers to a second item that is associated with the user;

determine the second keyword is an explicit reference to the second item; and store an association between the second keyword and the third feature vector in the reference list.

17. The computer program product of claim 15, wherein determining the keyword is an implicit reference comprises:

comparing the keyword to a list of words, wherein each word corresponds with an implicit reference; and determining the keyword is an implicit reference in response to determining that the keyword matches a word in the list of words.

18. The computer program product of claim 15, wherein identifying the keyword in the sentence comprises:

parsing the sentence into the plurality of words;

comparing each word from the plurality of words to a list of words; and determining a first word from the plurality of words matches a second word from the list of words.

19. The computer program product of claim 15, wherein receiving the sentence comprises:

receiving an audio signal of the user speaking; and converting the audio signal into text.

20. The computer program product of claim 15, wherein outputting the sentence with the first explicit reference comprises sending the sentence to a network device configured to perform an action based on the sentence.

\* \* \* \* \*